US008620632B2

(12) United States Patent
An et al.

(10) Patent No.: US 8,620,632 B2
(45) Date of Patent: Dec. 31, 2013

(54) ESTIMATING BUILDING THERMAL PROPERTIES BY INTEGRATING HEAT TRANSFER INVERSION MODEL WITH CLUSTERING AND REGRESSION TECHNIQUES FOR A PORTFOLIO OF EXISTING BUILDINGS

(75) Inventors: Lianjun An, Yorktown Heights, NY (US); Young T. Chae, Yorktown Heights, NY (US); Raya Horesh, Ossining, NY (US); Young Min Lee, Old Westbury, NY (US); Chandrasekhara K. Reddy, Kinnelon, NJ (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/168,116

(22) Filed: Jun. 24, 2011

(65) Prior Publication Data
US 2012/0330626 A1   Dec. 27, 2012

(51) Int. Cl.
*G06F 17/50*   (2006.01)
(52) U.S. Cl.
USPC ....... 703/2; 703/6; 703/18; 700/291; 702/130
(58) Field of Classification Search
USPC ................. 703/2, 6, 18; 700/291; 702/130
See application file for complete search history.

(56) References Cited

U.S. PATENT DOCUMENTS

2011/0231320 A1* 9/2011 Irving ........................ 705/80
2012/0316914 A1* 12/2012 Lee et al. .................... 705/7.24
2012/0323637 A1* 12/2012 Cushing et al. ............. 705/7.36

OTHER PUBLICATIONS

Chen, T.Y. et al., "Investigation of Practical Issues in Building Thermal Parameter Estimation" Building and Environment (Mar. 24, 2003) pp. 1027-1038, vol. 38.
ASHRAE Handbook, 2009 Fundamentals, American Society of Heating, Refrigerating and Air-Conditioning Engineers.
Abushakra, B., "An Inverse Model to Predict and Evaluate the Energy Performance of Large Commercial and Institutional Buildings" IBPSA Conference Proceedings (1997).
Chahwane, L. et al., "Using an Inverse Method to Evaluate Envelope Thermal Properties" Eleventh International IBPSA Conference—Building Simulation (Jul. 27-30, 2009) Glasgow, Scotland.
Kissock, J.K. et al., "Inverse Modeling Toolkit: Numerical Algorithms" ASHRAE Transactions (Jul. 11, 2003) pp. 425-434, vol. 109, part 2.
Rabl, A., "Parameter Estimation in Buildings: Methods for Dynamic Analysis of Measured Energy Use" Journal of Solar Energy Engineering (Feb. 1988) pp. 52-66, vol. 110.
Doe, 2006, U.S. Department of Energy, Buildings Energy Data Book.

* cited by examiner

*Primary Examiner* — Thai Phan
(74) *Attorney, Agent, or Firm* — Scully, Scott, Murphy & Presser, P.C.; Daniel P. Morris, Esq.

(57) ABSTRACT

A static heat transfer model is derived from a system of dynamic equations by integrating the dynamic equations over different time periods. That static heat transfer model links periodic (e.g., monthly) energy usage with cooling and heating degree hours, humidifying and dehumidifying hours. Its coefficients of measuring correlations correspond to the thermal parameters of buildings. Temporal data from a building may be used to estimate the overall heat transfer parameters. A clustering scheme may be developed to decompose all the buildings into different clusters based on one or more similarity criteria. The overall heat transfer parameters are separated into values for the wall, roof and window using multiple buildings' data in the same cluster or group.

24 Claims, 8 Drawing Sheets

ESTIMATING BUILDING THERMAL PROPERTIES BY INTEGRATING HEAT TRANSFER INVERSION MODEL WITH CLUSTERING AND REGRESSION TECHNIQUES FOR A PORTFOLIO OF EXISTING BUILDINGS

FIELD

The present application relates generally to thermal properties of a building, and more particularly to estimating building thermal properties by applying observable data on an integrated heat transfer model with clustering and regression techniques for a portfolio of existing buildings.

BACKGROUND

Saving energy, improving energy efficiency and reducing greenhouse gas (GHG) emissions are key initiatives in many cities and municipalities and for building owners and operators. The inventors in this disclosure have recognized that to reduce energy consumption in buildings, one should understand how heat is transferred from the outside to inside the buildings to various zones inside and how heating, ventilating, and air conditioning (HVAC) systems supply the building insides with air temperature and humidity to provide comfortable indoor climate for building occupants. For instance, one should understand the heat conduction, convection, radiation through a building envelope and between zones, latent and sensible heat inside the building, heat transfer through walls, windows, roofs and infiltration through the building openings, and others about the building. The inventors have further recognized that this understanding can be aided through development of a thermal heat transfer model by estimating heat transfer parameters (also called heat transfer coefficients) such as conduction parameters, convection parameters, infiltration parameters and solar radiation parameters. However, limited observable data and insufficient building information hinders such modeling, i.e., estimating the thermal parameters.

BRIEF SUMMARY

A method and system of determining heat transfer parameters of a portfolio of existing buildings may be provided. The method, in one aspect, may include generating dynamic equations describing heat and moisture transfer through building envelope. The method may also include generating a static heat transfer model by transforming the dynamic equations. The static heat transfer model may be generated by integrating the dynamic equations over a time period covering a season. The method may further include quantifying all terms for the generated static heat transfer model based on energy usage data associated with the existing buildings over the time period, dimension information associated with the existing buildings, data associated with one or more characteristics of the existing buildings, temperature information during the time period, and humidity information during the time period. The method may also include estimating coefficients of the terms by fitting calculated energy usage with the observed energy usage over multiple time periods. The estimated coefficients represent aggregated quantities of multiple physical properties of the building envelope. The method may further include clustering the existing buildings into two or more clusters of buildings based on a physical similarity associated with one or more characteristics of the existing buildings. The method may also include developing a regression model for each of the clusters of buildings. The regression model describes how the aggregated quantities mathematically depend on the multiple physical properties of the building envelope. The method may further include estimating individual heat transfer parameters associated with individual components of the building envelope based on the regression model and the estimated coefficients representing aggregated quantities of multiple physical properties of the building envelope.

A system for determining heat transfer parameters of a portfolio of existing buildings, in one aspect, may include a dynamic model characterizing heat and moisture transfer through building envelope and a static heat transfer model transformed from the dynamic equations, the static heat transfer model generated by integrating the dynamic equations over a time period covering a season. An inverse parameter estimation module may be operable to execute on the processor and further operable to perform inverse parameter estimation based on at least the static heat transfer model, energy usage data associated with the existing buildings over the time period, dimension information associated with the existing buildings, data associated with one or more characteristics of the existing buildings, temperature information during the time period, and humidity information during the time period. The inverse parameter estimation module may be operable to determine the heat transfer parameters associated with the overall building envelope based on the inverse parameter estimation. A clustering module may be operable to cluster the existing buildings into two or more clusters of buildings based on the dimension information associated with the existing buildings and the data associated with one or more characteristics of the existing buildings. A regression model associated with each of the clusters of buildings describes the heat transfer parameters associated with the overall building envelop in terms of individual components of the building envelop. A module may be operable to estimate individual heat transfer parameters associated with individual components of the building envelope based on the regression model and the heat transfer parameters associated with the overall building envelope.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure describes estimating buildings' thermal parameters, also referred to as heat transfer parameters of building envelopes. The building envelopes physically separate the interior and the exterior environments of a building, and may be also referred to as the building enclosure. In one embodiment, a methodology of the present disclosure may estimate building's thermal parameters from limited observation data (limited with respect to the number of sensors in actual operating condition). The parameters that are recovered or estimated in the present disclosure may include thermal properties of building fabrics such as wall, roof, and windows, and heat exchange due to air infiltration through openings of building envelope, or any combinations thereof. A model that estimates building's thermal parameters in the present disclosure in one embodiment is built considering that, the higher the resistance of a building's envelope to the outside climate (e.g., high temperature or low temperature), the less energy required to make the internal space condition comfortable for its occupants.

In one embodiment of the present disclosure, a static heat transfer model is derived from a system of dynamic equations by integrating the equations over different time periods. That static heat transfer model links periodic (e.g., monthly) energy usage with cooling and heating degree hours, humidifying and dehumidifying hours. Its coefficients of measuring correlations correspond to the thermal parameters of buildings. Temporal data from a building may be used to estimate the overall heat transfer parameters. A clustering scheme may be developed to decompose all the buildings into different clusters based on one or more similarity criteria. The overall heat transfer parameters are separated into values for wall, roof and window using multiple buildings' data in the same cluster or group.

To estimate thermal parameters of a building, one may apply a forward modeling approach with detailed knowledge about types of material used and engineering data. Architects and engineers typically use experimental formulas to estimate the corresponding thermal parameters (ASHRAE Handbook, Fundamental 2009) to design new buildings and estimate their energy performance. However, this forward modeling approach may not be feasible for existing buildings because the engineering data and design documents are not typically available and also because the originally built condition may have changed by internal and external component modifications in operation condition. In the present disclosure in one embodiment, an inversion modeling approach is used, in which parameters are estimated through inversion of a physical model prescribed by a set of differential equations (partial or ordinary) using observable data.

Figure 1:
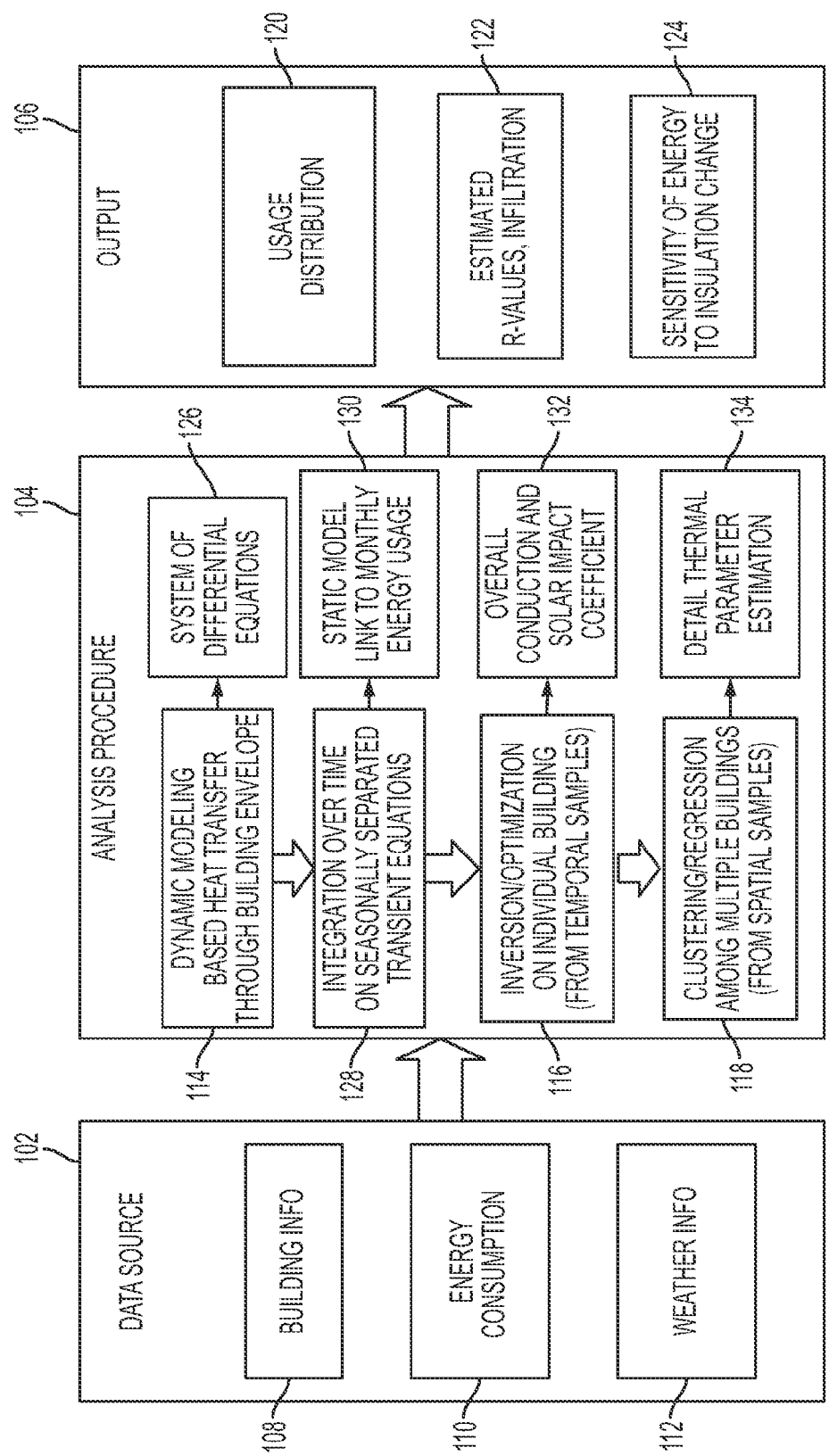
FIG. 1 shows a physical modeling process of the present disclosure in one embodiment utilizing the inversion method.

FIG. 1 shows a physical modeling process of the present disclosure in one embodiment utilizing the inversion method. Input data 102 may include static building information 108, dynamic (time dependent) weather data 112 and energy consumption data 110. Static building information 108 may be building's geometrical properties of areas such as wall areas, window areas and roof area, and the physical characteristics of the components such as the heat capacity and density properties associated with a wall, a window and a roof. Dynamic weather data 112 may be the outside air temperature, humidity and solar radiation in different time periods. Energy consumption data 110 may specify how much energy sources (e.g., electricity, oil, and/or gas) is used in the building.

In one embodiment of the present disclosure, an analytic procedure 104 includes developing a physical dynamic model 114 that describes heat transfer through the building envelope. The model includes a system of differential equations 126. Equations (1)-(4) below are examples of the dynamic model 114 that includes a system of differential equations 126. A physics-based static heat transfer model 128 may be derived from time integration and seasonal separation. Integrating the dynamic model 114 over time on seasonally separated transient equations produces a static model 130 that describes the energy usage in periods, for example, monthly energy usage. Here, in one aspect, the monthly energy consumption is associated with the building thermal properties as well as overall weather change in that month. Equation (10) below is an example of the static model 130. At 116, an inversion process with minimizing misfit between calculated and observed data on an individual building produces the overall conduction and solar heat gain coefficient 132. Specifically, by fitting the model 130 with multiple monthly data (or other periodic data), the overall heat resistance coefficient of heat flow of the building can be obtained. The inversion process is described below in more detail, for instance, with reference to Equation (11). At 118, the overall heat resistance coefficient is decomposed into thermal parameters related to different building envelope components such as walls, roofs and windows. In one embodiment of the present disclosure, clustering techniques are employed to estimate the thermal parameters 134. In one aspect, it may be assumed that there are multiple buildings with roughly the same physical parameters but with different dimensions, which the methodology of the present disclosure may cluster into different groups based on the buildings having similar characteristics. Then all thermal parameters may be obtained from a regression model associated with each cluster.

The analytic procedure 104 in one embodiment of the present disclosure results in thermal parameter estimation 134, which may be utilized or generated as one or more outputs 106. For instance, the derived physical model 130 may be used to generate usage distribution between heating and cooling 120. The derived physical model 130 may be also used to generate heat loss or gains through different parts of the building envelope 122. The derived physical model 130 may be further used in performing sensitivity analysis that determines how energy consumption changes as insulation condition changes 124, e.g., insulation condition of a wall, roof or window.

The dynamic physical model derivation shown in 114 and 126 may include developing heat and moisture transfer equations through a building envelope. By integration of these equations over time-periods, a balance equation (static model 130) for cooling and heating seasons may be derived for counting different energy requirement. For the cooling season during summer time, the equation may model using an air-conditioner to cool down the temperature and to dehumidify the air inside a building. For the heating season during the winter time, the equation may model using heating to heat up the temperature and possibly to humidify the air inside a building. A heat transfer model may be derived for the total energy usage in a period (e.g., monthly), associated to heating gain or loss via conduction, convection and radiation through the building envelop.

Figure 2:
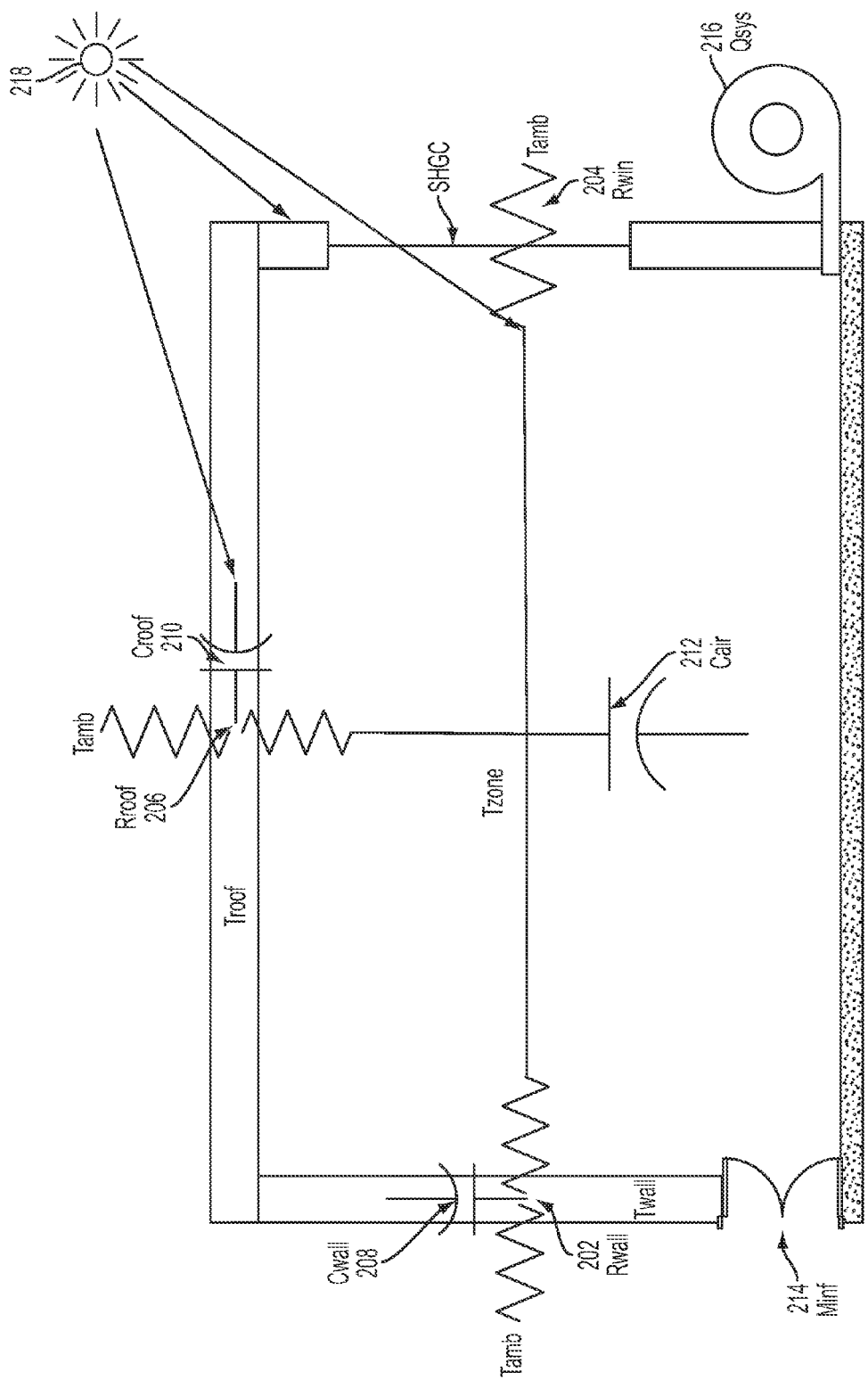
FIG. 2 illustrates heat conduction through a building envelop in one embodiment of the present disclosure.

FIG. 2 illustrates heat transfer through a building envelop in one embodiment of the present disclosure. In analogy to electronic notation, heat transfer may be expressed by a network of capacitors and resistors for heat conduction through a building envelope. Thermal resistance (R-value) is used to measure the effectiveness of an insulator and may be defined as the ratio of temperature difference across an insulator and the heat flux (heat transfer per unit time per unit area). In the present disclosure, the notations of $R_{wall}$, $R_{win}$ and $R_{roof}$ are used for R-values of a wall, window and roof, respectively, as shown at 202, 204 and 206 in FIG. 2. Thermal heat capacity is used to measure the capability of storing heat inside the object and may be defined as the ratio of the amount of heat energy transferred into the object and the resulting increase in temperature of the object. In one embodiment of the present disclosure, specific heat capacity (C-value)—heat capacity per unit of mass, is used. $C_{wall}$, $C_{roof}$ and $C_{air}$ denote the all roof specific heat of wall 208, specific heat of roof 210 and specific heat of inside air 212, respectively, for the building. Thermal transmittance (U-value) is the reciprocal of R-value, and is commonly used for windows. Heat can be also transferred when the outside air is penetrated into the space through opened windows and doors as well as through other openings and cracks in the building envelop, intentionally or un-intentionally. The symbol $M_{inf}$ represents air exchanging rate corresponding to infiltration and ventilation as shown at 214. The symbol $Q_{sys}$ represents the supply air flow from HVAC system as shown at 216, which is used to adjust temperature and humidity inside the building, for example, to provide the desirable or comfortable condition to the building occupants. Another main source that influences the temperature of wall, roof and zone air may come directly from solar radiation on building envelop surfaces as shown at 218.

The following illustrates a system of equations that corresponds to the schematic diagram shown in FIG. 2. These are dynamical model equations.

$$\rho_{air} C_{air} V_z \frac{dT_z}{dt} = \frac{2A_{wall}}{R_{wall}}(T_{wall} - T_z) + \frac{2A_{roof}}{R_{roof}}(T_{roof} - T_z) + \frac{A_{win}}{R_{win}}(T_{amb} - T_z) + \rho_{air} C_{air} m_{inf} A_{leak}(T_{amb} - T_z) + Q_{sol} \lambda_{shgc} A_{win} + \sum Q_{hi} + \rho_{air} C_{air} m_{sys}(T_{sys} - T_z) \quad (1)$$

$$\rho_{wall} C_{wall} A_{wall} d_{wall} \frac{dT_{wall}}{dt} = \frac{2A_{wall}}{R_{wall}}(T_{amb} - T_{wall}) + \frac{2A_{wall}}{R_{wall}}(T_z - T_{wall}) + Q_{sol} \lambda_{wall} A_{wall} \quad (2)$$

$$\rho_{roof} C_{roof} A_{roof} d_{roof} \frac{dT_{roof}}{dt} = \frac{2A_{roof}}{R_{roof}}(T_{amb} - T_{roof}) + \frac{2A_{roof}}{R_{roof}}(T_z - T_{roof}) + Q_{sol} \lambda_{roof} A_{roof} \quad (3)$$

$$\rho_{air} V_z \frac{dW_z}{dt} = \rho_{air} m_{inf} A_{leak}(W_{amb} - W_z) + \sum Q_{wi} + \rho_{air} m_{sys} W_{sys} - \rho_{air} m_{ret} W_z \quad (4)$$

where $\rho_{air}, \rho_{wall}, \rho_{roof}$: Density of air, wall and roof $\left(\frac{lb}{ft^3}\right)$ $C_{air}, C_{wall}, C_{roof}$: Specific heat capacity of air, wall and roof $\left(\frac{Btu}{F \cdot lb}\right)$ $A_{wall}, A_{roof}, A_{win}$: Area of wall, roof and window (ft²)

$d_{wall}, d_{roof}$: Thickness of wall and roof (ft²)

$A_{leak}$: Leakable area surrounding zone (ft²)

$R_{wall}, R_{roof}, R_{win}$: R-value for wall, roof and window $\left(\frac{h \cdot F \cdot ft^2}{Btu}\right)$ $T_{wall}, T_{roof}$: Temperature of wall, roof (F.)

$T_z, T_{amb}, T_{sys}$: Air temperature inside zone, ambient and from AHU system (F.)

$V_z$: Volume inside zone (ft³)

$W_z$: Moisture content inside zone — ratio of moisture mass over dry air mass $\left(\frac{lb_w}{lb_{da}}\right)$ $W_{amb}, W_{sys}$: Moisture content of ambient air and supply air from AHU $\left(\frac{lb_w}{lb_{da}}\right)$ $m_{inf}$: Infiltration rate — volume of air exchange per hour per unit area $\left(\frac{ft^3}{h \cdot ft^3}\right)$ $m_{sys}$: Supply air flow rate of AHU system $\left(\frac{ft^3}{h}\right)$ $m_{ret}$: return air flow rate of AHU system $\left(\frac{ft^3}{h}\right)$ $Q_{sol}$: Solar radiation per hour per unit area $\left(\frac{Btu}{h \cdot ft^2}\right)$ $\lambda_{shgc}$: Solar heat gain coefficient of glass (dimensionless)

$\lambda_{wall}, \lambda_{roof}$: Solar heat absorption coefficient of wall and roof (dimensionless)

$Q_{hi}$: Sensible load from electronic devices and occupants $\left(\frac{Btu}{h}\right)$ $Q_{wi}$: Moisture load from furniture surfaces and occupants $\left(\frac{lb_w}{h}\right)$ $h_v$: Specific enthalpy related to latent heat $\left(\frac{Btu}{lb_w}\right)$ $Q_{sys}, Q_{tsys}$: Total and thermal system energy consumption rate $\left(\frac{Btu}{h}\right)$ $Q_{csys}, Q_{hsys}$: Cooling and heating system energy consumption rate $\left(\frac{Btu}{h}\right)$ $q_{eff}, q_{cef}, q_{hef}$: Energy usage efficiency of total, cooling and heating system The first equation, Equation (1) above, describes thermal balance inside the building and is referred to as a heat balance equation inside a building. The left hand side (LHS) of the equation describes the accumulation of enthalpy for inside of a building per unit time. The first term on the right hand side (RHS) is for heat convection from the wall, the second term is for heat convection from the roof and the third term is for heat convection from the window. The fourth term is for air exchange between inside and outside of the building. The fifth term represents the contribution from solar radiation through the window. The sixth term represents the sensible heat loads emitted from electronic devices and occupants (e.g., body heat). The last term (7$^{th}$ term) is the heat flow from Heating, Ventilating, and Air Conditioning (HVAC) system.

The second and third equations (Equations (2) and (3) above) describe the similar energy balance for wall and roof. The LHS of those equations represent the accumulation of enthalpy inside of wall and roof, respectively. The RHS includes three terms attributed to thermal contribution. The first term on the RHS represents the heat convection from the outside air into the wall (Equation (2)) and the roof (Equation (3)), respectively. The second term represents the heat convection from wall (Equation (2)) and roof (Equation (3)), respectively, to inside the building (i.e., zone). The third term accounts for thermal energy from solar radiation, in wall (Equation (2)) and roof (Equation (3)), respectively. In one embodiment of the present disclosure, the similar equation for a window here is omitted, and a window's heat storing capability is not considered. This approximation is reasonable since window's heat storing capability is negligible due to its thickness, in comparison to a wall and a roof. The last equation (Equation (4)) describes the moisture balance which results from the air exchange between outside air and inside air, and that of supply and return air from and to the Air Handling Unit (AHU) system.

The following describes reduction of heat transfer differential equations above through seasonal separation and time integration. Thermal energy is consumed in both heating and cooling seasons, and historic energy consumption data are typically available in monthly levels. In one embodiment of the present disclosure, the equations for different seasons are separated, and the separated equations are integrated over monthly periods so that the integration of the system term would correspond to a monthly usage. It should be understood that while the description herein refers to monthly periods, any other time periods may be utilized.

Multiplying one-half (½) to both side of the equation (2) and regrouping the first and second terms in RHS of the equation (2), equation (5) below is obtained.

$$\frac{1}{2}\rho_{wall}C_{wall}A_{wall}d_{wall}\frac{dT_{wall}}{dt} = \frac{A_{wall}}{R_{wall}}(T_{amb}-T_z) - \frac{2A_{wall}}{R_{wall}}(T_{wall}-T_z) + \frac{1}{2}Q_{sol}\lambda_{wall}A_{wall}. \quad (5)$$

Similarly, from the equation (3), equation (6) below is obtained.

$$\frac{1}{2}\rho_{roof}C_{roof}A_{roof}d_{roof}\frac{dT_{roof}}{dt} = \frac{A_{roof}}{R_{roof}}(T_{amb}-T_z) - \frac{2A_{roof}}{R_{roof}}(T_{roof}-T_z) + \frac{1}{2}Q_{sol}\lambda_{roof}A_{roof}. \quad (6)$$

Substituting the equations (5) and (6) to the equation (1) and then adding $h_v$ times Equation (4), equation (7) is obtained.

$$\rho_{air}C_{air}V_z\frac{dT_z}{dt} + \frac{1}{2}\rho_{wall}C_{wall}A_{wall}d_{wall}\frac{dT_{wall}}{dt} + \frac{1}{2}\rho_{roof}C_{roof}A_{roof}d_{roof}\frac{dT_{roof}}{dt} + h_v\rho_{air}V_z\frac{dW_z}{dt} = \frac{A_{wall}}{R_{wall}}(T_{amb}-T_z) + \frac{A_{roof}}{R_{roof}}(T_{amb}-T_z) + \frac{A_{win}}{R_{win}}(T_{amb}-T_z) + Q_{sol}\lambda_{shgc}A_{win} + \frac{1}{2}Q_{sol}\lambda_{wall}A_{wall} + \frac{1}{2}Q_{sol}\lambda_{roof}A_{roof} + \sum Q_{hi} + h_v\sum Q_{wi} + \rho_{air}C_{air}m_{inf}A_{leak}(T_{amb}-T_z) + h_v\rho_{air}m_{inf}A_{leak}(W_{amb}-W_z) + \quad (7)$$

-continued
$$\rho_{air}C_{air}m_{sys}(T_{sys}-T_z) + h_v\rho_{air}(m_{sys}W_{sys}-m_{ret}W_z)$$

It may be assumed that $T_z$, $T_{wall}$ and $T_{roof}$ are maintained at a temperature during one month period. Multiplying (7) by $sgn(T_{amb}-T_z)-sgn(T_z-T_{amb})$ and then integrating it over one period, equation (8) below is obtained.

$$\left(\frac{A_{wall}}{R_{wall}} + \frac{A_{roof}}{R_{roof}} + \frac{A_{win}}{R_{win}}\right)\int_{t_0}^{t_1}((T_{amb}-T_z)^+ + (T_z-T_{amb})^+)d\tau + \quad (8)$$

$$\left(\lambda_{shgc}A_{win} + \frac{1}{2}\lambda_{wall}A_{wall} + \frac{1}{2}\lambda_{roof}A_{roof}\right)$$

$$\int_{t_0}^{t_1}Q_{sol}(sgn(T_{amb}-T_z)-sgn(T_z-T_{amb}))d\tau +$$

$$\sum_i\int_{t_0}^{t_1}(Q_{hi}+h_vQ_{wi})(sgn(T_{amb}-T_z)-sgn(T_z-T_{amb}))d\tau +$$

$$\rho_{air}A_{leak}\int_{t_0}^{t_1}m_{inf}(C_{air}((T_{amb}-T_z)^+ + (T_z-T_{amb})^+) +$$

$$h_v(W_{amb}-W_z)(sgn(T_{amb}-T_z)-sgn(T_z-T_{amb})))d\tau =$$

$$\rho_{air}C_{air}\int_{t_0}^{t_1}m_{sys}((T_z-T_{sys})^+ + (T_{sys}-T_z)^+)d\tau +$$

$$h_v\rho_{air}\int_{t_0}^{t_1}(m_{sys}W_{sys}-m_{ret}W_z)(sgn(T_{amb}-T_z)-sgn(T_z-T_{amb}))d\tau$$

Assume that $(T_z-T_{sys})(T_{amb}-T_z)>0$, and $T_{sys}$ plays an opposite role compared with $T_{amb}$ and actually adjusts temperature inside the zone. When choosing $T_z$ to be equal to the setting temperature, the first term in equation (8) would be the sum of cooling degree hours CDH and heating degree hours HDH of the given month.

$$\int_{t_0}^{t_1}((T_{amb}-T_z)^+ + (T_z-T_{amb})^+)d\tau = \sum_j(CDH_j+HDH_j)$$

$$\Delta\tau_j\int_{t_0}^{t_1}Q_{sol}(sgn(T_{amb}-T_z)-sgn(T_z-T_{amb}))d\tau =$$

$$\sum_j Q_{sol}(j)\frac{CDH_j-HDH_j}{CDH_j+HDH_j}\Delta\tau_j.$$

$$\int_{t_0}^{t_1}m_{inf}(C_{air}((T_{amb}-T_z)^+ + (T_z-T_{amb})^+) +$$

$$h_v(W_{amb}-W_z)(sgn(T_{amb}-T_z)-sgn(T_z-T_{amb})))d\tau =$$

$$m_{inf}\left(C_{air}\sum_j(CDH_j+HDH_j)\Delta\tau_j + h_v\sum_j\frac{DMH_j\cdot CDH_j+HMH_j\cdot HDH_j}{CDH_j+HDH_j}\Delta\tau_j\right)$$

where the term DMH is dehumidifying hours and HMH is humidifying hours. The index j is for time and hour is taken as the base unit. So $\Delta\tau_j=1$ when data are available in hour. Equation (8) can be rewritten as, $$\left(\frac{A_{wall}}{R_{wall}} + \frac{A_{roof}}{R_{roof}} + \frac{A_{win}}{R_{win}}\right)\sum_j (CDH_j + HDH_j)\Delta\tau_j + \quad (9)$$

$$\rho_{air}A_{leak}m_{inf}\left(C_{air}\sum_j (CDH_j + HDH_j)\Delta\tau_j + \right.$$

$$\left. h_v \sum_j \frac{DMH_j \cdot CDH_j + HMH_j \cdot HDH_j}{CDH_j + HDH_j}\Delta\tau_j\right) +$$

$$\left(\lambda_{shgc}A_{win} + \frac{1}{2}\lambda_{wall}A_{wall} + \frac{1}{2}\lambda_{roof}A_{roof}\right)$$

$$\sum_j Q_{sol}(j)\frac{CDH_j - HDH_j}{CDH_j + HDH_j}\Delta\tau_j +$$

$$\sum_i \sum_j (Q_{hi}(j) + h_v \cdot Q_{wi}(j))\frac{CDH_j - HDH_j}{CDH_j + HDH_j}\Delta\tau_j =$$

$$\sum_j \frac{\lambda_{cef}Q_{csys}(j) \cdot CDH_j + \lambda_{hef}Q_{hsys}(j) \cdot HDH_j}{CDH_j + HDH_j}\Delta\tau_j =$$

$$\lambda_{eff}\sum_j Q_{sys}(j)\Delta\tau_j$$

In grouping terms with either CDH or HDH (in numerators), separated static models for cooling and heating usages are obtained. The above static model (Equation (9)) described the whole or entire energy usage.

The data for one or more of the terms in Equation (9), for instance, loading rate in the fourth term in the left hand side (LHS) of the equation, might not be available. In one embodiment, the methodology of the present disclosure may take the gross squared foot (GSF) and the number of people (NOP) that use the building as a proxy. The methodology of the present disclosure in one embodiment may utilize the monthly energy usage from monthly usage bill. In order to complete the model, the methodology of the present disclosure in one embodiment includes non-thermal related usage, such as hot water, cooking facilities (ventilation attached to them), and others. A base usage is added to the left side of the equation and the total energy usage is substituted on the right side of the equation. Then the following static heat transfer model may be developed:

$$\lambda_{env}A_{env}\sum_j (p_c CDH_j + p_h HDH_j)\Delta\tau_j + \quad (10)$$

$$\lambda_{inf}\rho_{air}A_{leak}\sum_j \left(C_{air}(p_c CDH_j + p_h HDH_j) + \right.$$

$$\left. h_v \frac{p_c CDH_j * DMH_j + p_h * HDH_j * HMH_j}{CDH_j + HDH_j}\right)\Delta\tau_j +$$

$$\lambda_{base}\sum_j \sqrt{GSF \cdot NOP_j}\,\Delta\tau_j + \lambda_{load}$$

$$\sum_j \sqrt{GSF \cdot NOP_j}\,\frac{p_c CDH_j - p_h HDH_j}{CDH_j + HDH_j}\Delta\tau_j +$$

$$\lambda_{sol}A_{env}\sum_j Q_{sol}(j)\frac{p_c CDH_j - p_h HDH_j}{CDH_j + HDH_j}\Delta\tau_j =$$

$$q_{eff}\sum_j Q_{sys}(j)\Delta\tau_j$$

where $p_c$ is the percentage area being air-conditioned and $p_h$ the percentage area being heated, $$A_{env} = A_{wall} + A_{roof} + A_{win} \quad (10.1)$$

$$\frac{A_{wall}}{R_{wall}} + \frac{A_{roof}}{R_{roof}} + \frac{A_{win}}{R_{win}} = \lambda_{env}A_{env}$$

$$\lambda_{wall}A_{wall} + \lambda_{roof}A_{roof} + \lambda_{shgc}A_{win} = \lambda_{sol}A_{env}.$$

The set of parameters in Eq. (10) is related to building material, dimension and usage pattern. $p_c$, $p_h$, $q_{eff}$, $A_{env}$, $A_{leak}$, GSF, $\rho_{air}$, $C_{air}$, $h_v$ are a percentage area being air-conditioned, a percentage area being heated, energy usage efficiency, area of the envelope, leak area on the envelope, gross square foot of the building, air density, specific heat of air, specific enthalpy of latent heat respectively; the variables with index j are dynamic observables, NOP, CDH, HDH, DMH, HMH, $Q_{sol}$, $Q_{sys}$ are number of building occupants, cooling degree hours, heat degree hours, dehumidifying hours, humidifying hours, solar radiations, system energy usages respectively, $\Delta\tau$ is length of time period in which observables are available; the variables $\lambda_{env}$, $\lambda_{inf}$, $\lambda_{base}$, $\lambda_{load}$, $\lambda_{sol}$ are to be determined.

The static heat transfer model of Equation (10) combines the individual parameter associated with a building envelop (e.g., wall, roof, window) in the static model of Equation (9), into overall parameter, for instance, as specified in Equation (10.1).

Using the static heat transfer model (Equation (10)), five parameters, $\lambda_{env}$, $\lambda_{inf}$, $\lambda_{base}$, $\lambda_{load}$, $\lambda_{sol}$ are to be determined in one embodiment of the present disclosure. The parameter $\lambda_{env}$ is for the overall heat transfer; the parameter $\lambda_{inf}$ corresponds to infiltration $m_{inf}$ through the openings of the building envelop; the parameter $\lambda_{base}$ is for the non-thermal energy consumption; the $\lambda_{load}$ is for sensible loads that have heating contribution; the $\lambda_{sol}$ is for the overall solar contribution coefficient. In one embodiment of the present disclosure, in order to make them comparable across different buildings, the overall heat transfer and solar contribution are normalized by the area of the building envelope; the non-thermal base load and the sensible load are normalized by the geometrical average of GSF and NOP. Note that a fundamental difference between overall heat transfer and infiltration is from inclusion of DMH and HMH in the infiltration, since moisture could not get into the building via heat transfer (e.g., heat conduction and convection). Also it should be noted that sensible load and solar contribution are different for cooling and heating energy usage. During cooling season, additional energy is needed to offset the heat from sensible load and solar radiation, while during heating season, less energy is used due to contribution from sensible load and solar radiation.

Figure 3:
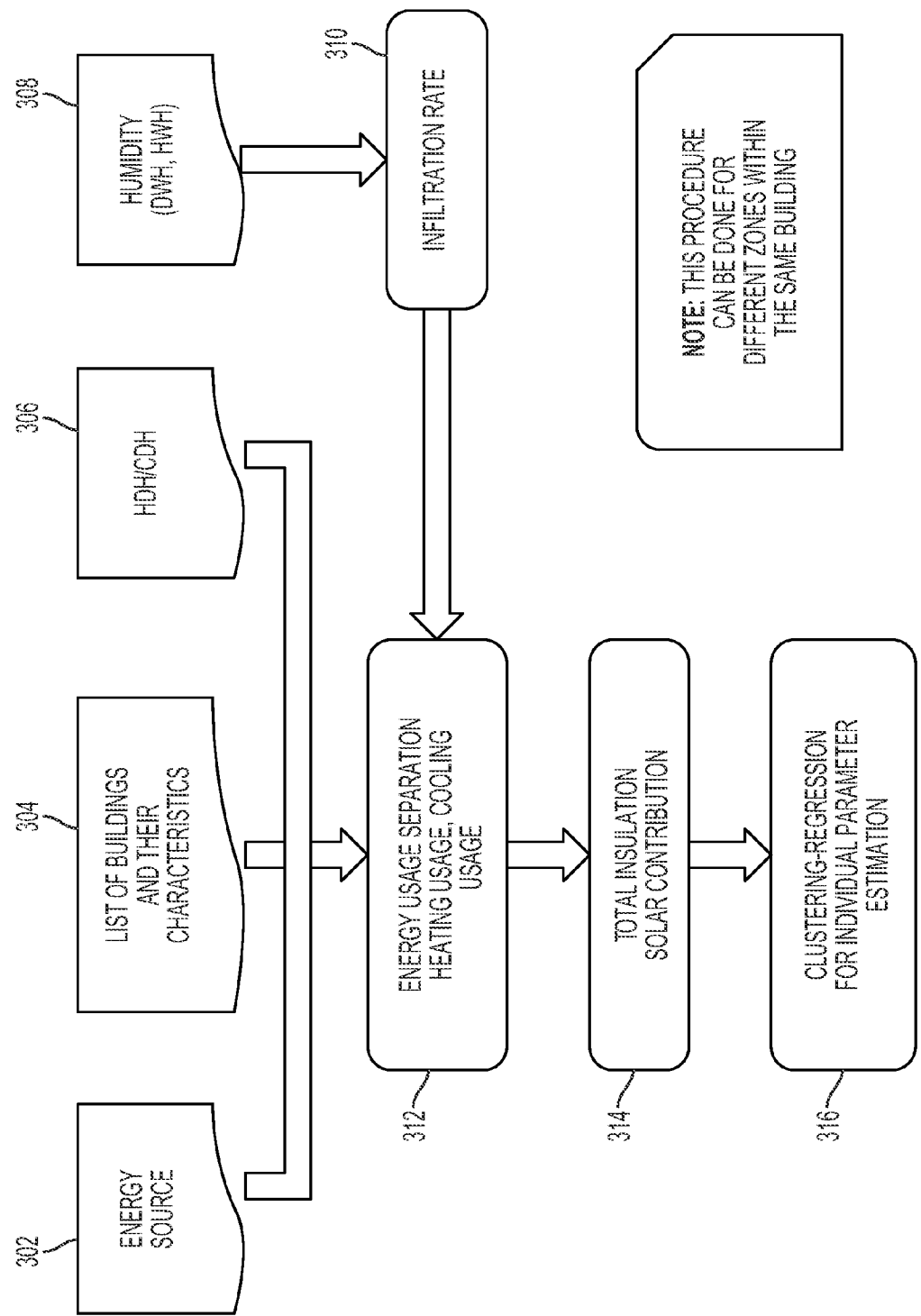
FIG. 3 shows data flow for estimating the thermal parameters in one embodiment of the present disclosure.

FIG. 3 shows data flow overview for estimating the thermal parameters in one embodiment of the present disclosure. In one embodiment, the data used in the procedure includes data associated with energy source 302, list of buildings and their characteristics 304, HDH and CDH 306, and humidity 308. Data associated with energy source 302 may include monthly energy usage, for example, reported in monthly statement from energy providers. The data associated with a list of buildings and their characteristics 304 may include a list of buildings with dimension information, from which the methodology of the present disclosure may calculate the area of wall, roof and window, the volume of the building. The data associated with a list of buildings and their characteristics 304 may also include information such as operation characteristics, like total occupancy, operation hours, and number of electric appliances and equipment used in the building. HDH and CDH 306 are related to temperature, cooling degree hours and heating degree hours for each day within a month, which are calculated from the difference between outside air temperature and the temperature set point inside the building. Note that the set point could be different for cooling and heating and for daytime verses nighttime. Data associated with humidity 308 is related to humidity, for example, humidifying hours (HMH) during winter and dehumidifying hours (DMH) during summer compared with a comfortable humidity level. Under the assumption that moisture would not be transferred by heat conduction and convection into the building and is only infiltrated into the building, the DMH and HMH may help to separate overall heat conduction through building envelope with overall air exchange and infiltration 310. Based on all data described above, the methodology of the present disclosure in one embodiment may separate the total energy usage into cooling, heating and non-thermal energy usages at 312. Further, the derived static model can be used for each individual building with multiple monthly usages to estimate total heat transfer coefficient and solar contribution coefficients at 314. At 316, clustering technique may be applied on the collection of buildings and separate the overall heat transfer coefficient into values for different thermal parameters related to wall, roof and window, individually. In another embodiment, the same procedure may be used for multiple zones in a single building, as long as all zones have different dimensions, physical conditions and usage patterns.

To estimate the above five parameters in equation (10), in one embodiment of the present disclosure, thermal parameter estimation by inversion process from temporal observable data may be performed. For ease of illustrating the inversion process—estimating these parameters, a matrix L with dimension $5 \times N_m$ is introduce, where $N_m$ is the number of months with available data and k is used for monthly index. The entries of the matrix L are expressed as, for each month k, $$L[1,k] = A_{env} \sum_j (p_c CDH_j + p_h HDH_j) \Delta \tau_j$$

$$L[2,k] = \rho_{air} A_{leak} \sum_j \left( \begin{array}{c} C_{air}(p_c CDH_j + p_h HDH_j) + \\ h_v \dfrac{p_c CDH_j * DMH_j + p_h * HDH_j * HMH_j}{CDH_j + HDH_j} \end{array} \right) \Delta \tau_j$$

$$L[3,k] = \sum_j \sqrt{GSF \cdot NOP_j} \, \Delta \tau_j$$

$$L[4,k] = \sum_j \sqrt{GSF \cdot NOP_j} \, \frac{p_c CDH_j - p_h HDH_j}{CDH_j - HDH_j} \Delta \tau_j$$

$$L[5,k] = A_{env} \sum_j Q_{sol}(j) \frac{p_c CDH_j - p_h HDH_j}{CDH_j - HDH_j} \Delta \tau_j$$

$$G[k] = \sum_j Q_{sys}(j) \Delta \tau_j$$

$$(\lambda_1, \lambda_2, \lambda_3, \lambda_4, \lambda_5) = (\lambda_{env}, \lambda_{inf}, \lambda_{base}, \lambda_{load}, \lambda_{sol}).$$

Then the equation (10) can be rewritten as, $$\sum_{i=1}^{5} L[i,k]\lambda[i] = q_{eff} G[k]. \quad (11)$$

The term G[k] on RHS is from total energy usage for a month. The vectors CDH, HDH, DMH, HMH, $Q_{sol}$ in matrix L for month k with dimension $N_{kd}$=24·(number of days in the $k^{th}$ month)

are calculated from weather data for hourly temperature, from comparing relative humidity and solar radiation strength with cooling and heating set points, comfortable relative humidity. In the case no data associated with operation hours and occupancy are available, a function form may be assumed for the NOP vector that takes working days or school days with hours from 8 a.m. to 6 p.m. into consideration. Suppose that building dimension data are available to calculate the area ($A_{env}$) of the building envelop and gross squared foot (GSF) and the percentage area being air-conditioned and heated is specified. All values of entries of L are determined. Since equation (10) is derived from physical consideration, it is expected in one embodiment of the present disclosure that all five factors included in L[i,•] are relevant from statistical viewpoint.

It might be difficult to separate the heat gain from convection and infiltration due to two reasons. First, controlling humidity inside the building is not as easy as controlling temperature based on set point through thermostat. Second, infiltration through door and window opening is largely influenced by occupant behavior. In the present disclosure in one embodiment, it is desired to combine the least squared of differences with some penalty term to ration percentage on heat convection and infiltration, and to specify certain range constraint for total conduction parameter $$\min \left\{ \sum_k \left( \sum_{i=1}^{5} \lambda_i L[i,k] - q_{eff} G[k] \right)^2 + \eta_1 \sum_k (0.75 * \lambda_1 L[1,k] - 0.25 * \lambda_2 L[2,k])^2 \right\},$$

$$\frac{1}{A_{end}} \left( \frac{A_{wall}}{\max(R_{wall})} + \frac{A_{roof}}{\max(R_{roof})} + \frac{A_{win}}{\max(R_{win})} \right) < \lambda_{env} < \frac{1}{A_{end}} \left( \frac{A_{wall}}{\min(R_{wall})} + \frac{A_{roof}}{\min(R_{roof})} + \frac{A_{win}}{\min(R_{win})} \right)$$

where the minimum and maximum of R-value for each would come from the listed value in ASHRAE handbook. This methodology fitted well over 90% of cases for 1,400 buildings that were modeled.

The values $\lambda_{env}$, $\lambda_{sol}$ that were obtained above are overall heat convection and solar contribution coefficients. The Equation (11) provides the relationship between the overall coefficient and the parameters distributed to wall, roof and windows. In one aspect, using just one building dimension information, it is not possible to determine these parameters' values for wall, roof and window due to its under-determinacy. When there are a collection of buildings with various dimensions but having physical similarities, it is possible to estimate these parameters' values. The physical similarities could be due to different reasons. For instance, the buildings built before 1970 may all use single-pane glasses. The buildings for the same functions (like for schooling) may use the same building code and same materials for wall and roof during certain period.

Mathematically, the methodology of the present disclosure in one embodiment may convert a building dimension data into a geometric point in a topological space. The distance of two points in space, in some measure, corresponds to the closeness of the similarity of two buildings. The K-Means clustering algorithm (MacQueen, 1967) can be used to put all buildings into several groups based on such topological information. The methodology of the present disclosure in one embodiment uses a clustering technique having an initial K-Means clustering and subsequent iterating until meeting a converging criterion.

Figure 4:
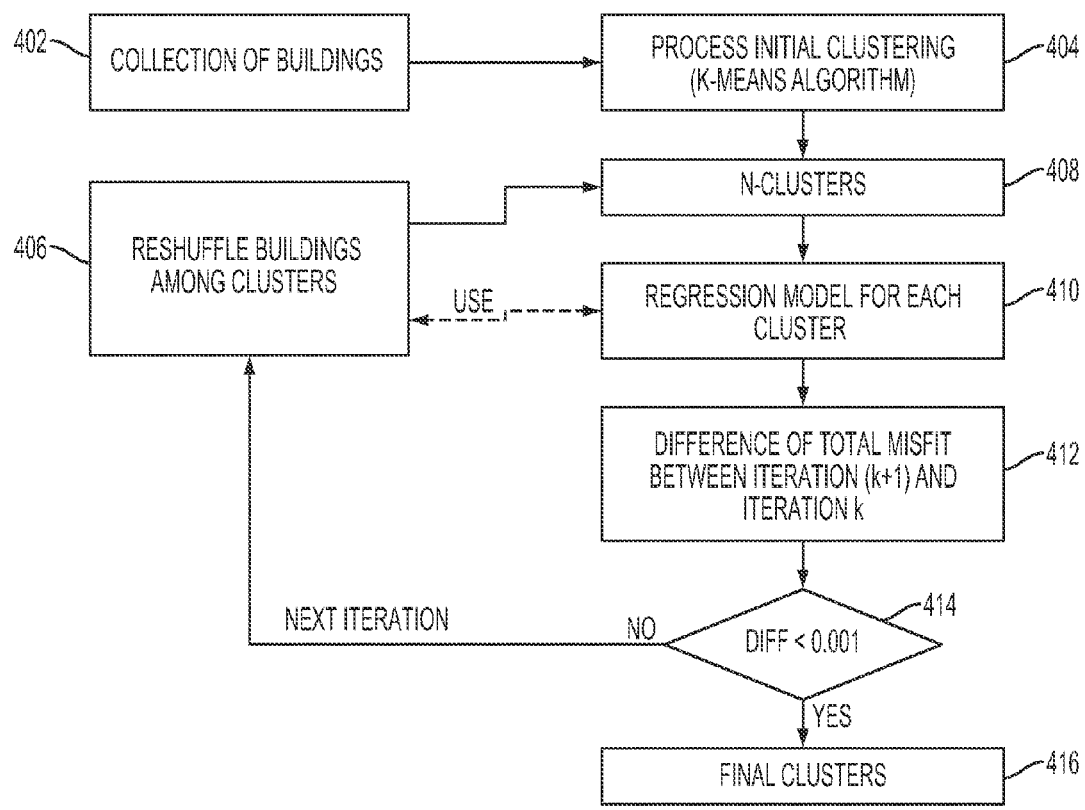
FIG. 4 shows a clustering process in one embodiment of the present disclosure.

FIG. 4 shows a clustering process in one embodiment of the present disclosure. Let S be the collection of buildings (402) with size M, and $S_n^k$ (n=1, 2, ..., N) be a set of buildings that belong to the cluster n in the $k^{th}$ iteration, where N is specified number of clusters (shown at 408), as in the following:

$$S = \bigcup_{n=1}^{N} S_n^k, \; S_i^k \cap S_j^k = \phi \; \forall \; i \neq j,$$

$$\sum_{n=1}^{N} \text{size}(S_n^k) = \sum_{n=1}^{N} M_n^k = \text{size}(S) = M,$$

where $M_n^k$ is the number of buildings that belong to the set $S_n^k$.

Clustering 404 may utilize K-means algorithm in one embodiment. For each cluster $S_n^k$ (n=1, 2, ..., N), the thermal parameters $R_{wall}$ [n], $R_{roof}$ [n] and $k_{win}$ [n] can be obtained through regression over all buildings that belong to the cluster, for example, as shown at 410. The misfit for a building $m_n$ that belongs to the cluster n is represented as $$\text{misfit}[m_n] = \text{abs}\left(\frac{A_{wall}[m_n]}{R_{wall}[n]A_{env}[m_n]} + \frac{A_{wall}[m_n]}{R_{wall}[n]A_{env}[m_n]} + \frac{A_{wall}[m_n]}{R_{wall}[n]A_{env}[m_n]} - \lambda_{env}[m_n]\right). \quad (12)$$

The total misfit for all buildings would be $$\text{misfit}_{total}^k = \sum_{m=1}^{M} \text{misfit}[m].$$

A reshuffling step 406 is processed as follows in one embodiment of the disclosure. For each given building m, the method may check its error against all N models, $$\text{error}[m_n] = \text{abs}\left(\frac{A_{wall}[m]}{R_{wall}[n]A_{env}[m]} + \frac{A_{wall}[m]}{R_{wall}[n]A_{env}[m]} + \frac{A_{wall}[m]}{R_{wall}[n]A_{env}[m]} - \lambda_{env}[m]\right),$$

and move this building into the one that provides the least error. After reshuffling, the methodology of the present disclosure in one embodiment obtains a new set of clusters $S_n^{k+1}$ (n=1, 2, ..., N). A new model is created for each cluster and new $\text{misfit}_{total}^{k+1}$ is calculated for this iteration. At 412, the difference of total misfit between iterations is compared. When the related change is small enough (e.g., at 414), the methodology of the present disclosure in one embodiment may stop further iteration (e.g., 416) and use the last set of models for parameters. Otherwise, the methodology of the present disclosure in one embodiment may continue the reshuffling step (e.g., at 406) and create a new set of models for new clusters and check total misfit again until convergence.

Figure 5:
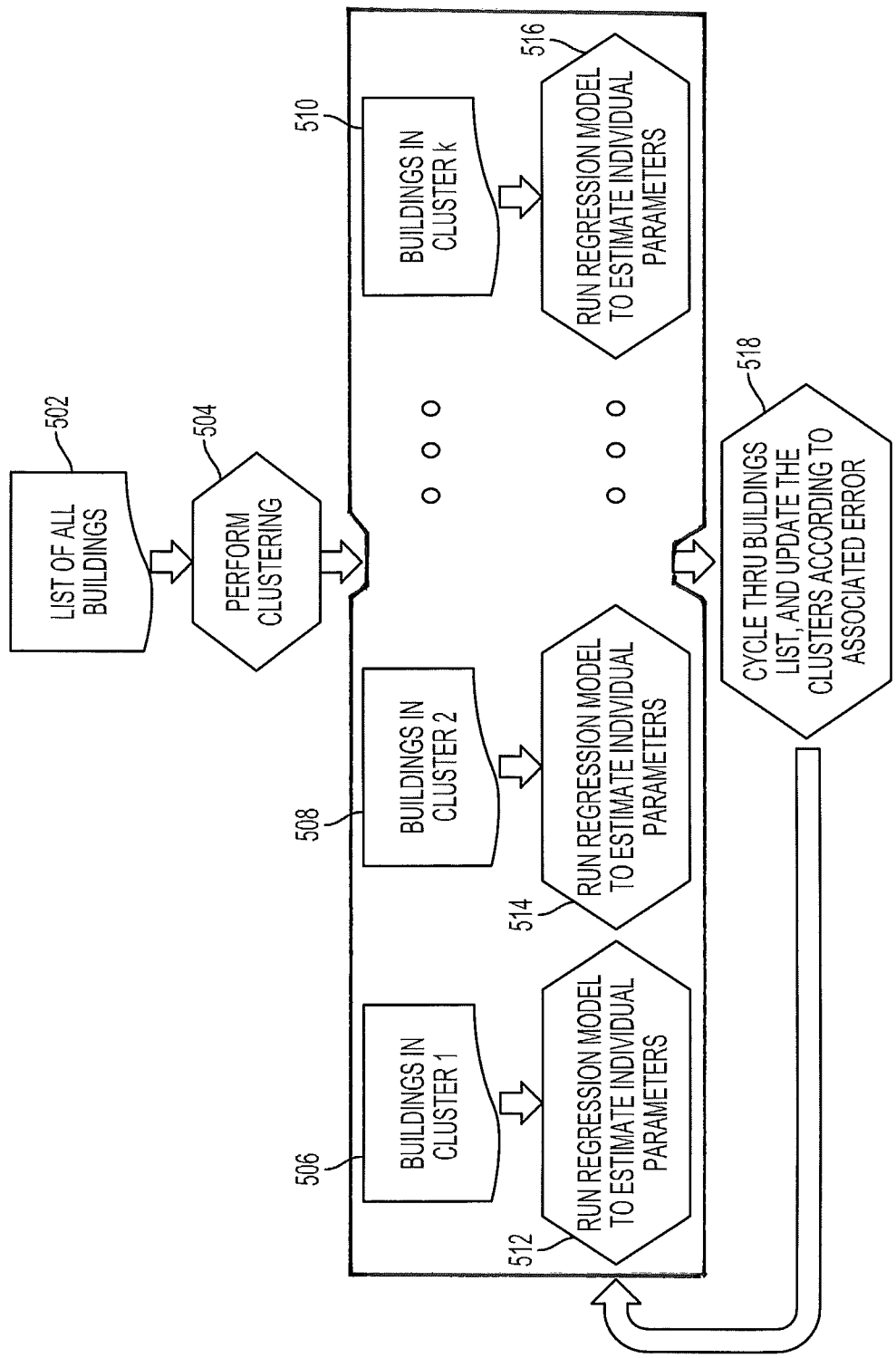
FIG. 5 illustrates the clustering procedure in another aspect.

FIG. 5 illustrates the clustering procedure in another aspect. Clustering at 504 may be performed based on the information received associated with buildings 502. Initial clustering creates multiple clusters, indicated by "Buildings in cluster 1" 506, "Buildings in cluster 1" 508, ..., "Buildings in cluster k" 510. Each cluster (506, 508, ..., 510) has its own model in the sense that the resulting regression coefficients are unique for each cluster. Each regression model (512, 514, ..., 516) may be run to estimate individual parameters for that cluster, e.g., $R_{wall}$, $R_{roof}$, $R_{win}$. Then iteration at 518 begins to re-evaluate the ownership of each building. Buildings are reshuffled among the clusters so that the quantified misfit is minimized. The iteration continues until the total misfit does not change by a predetermined threshold.

The regression models (512, 514, ..., 516) characterize or describe the heat transfer parameters associated with the overall building envelope in terms of individual components of the building envelop, e.g., $R_{wall}$, $R_{roof}$, $R_{win}$. In detail, all regression models are represented by Equation (10.1). But the coefficients would be estimated through the least-squared fit by using dimension data of all buildings that belong to the same cluster. In other words, data in each cluster yields one set of parameter estimation and leads to one regression model. The regression models referred to herein are least-square data misfit models.

Note that, it is possible to cluster a collection of buildings by using different clustering algorithms or based on different building characteristics for initial clustering or based on different distance measure. A building could belong to different groups under different clustering techniques. An algorithm may be developed to balance all contributions from different techniques. For instance, a weighted averaging scheme could be taken to estimate these parameters when multiple clustering techniques are adopted in the process.

In summary, starting with a system of dynamic equations that describe heat transfer through the building envelope, the methodology of the present disclosure in one embodiment may derive a static model by integration of equations over different time periods with thermal energy requirements. Coefficients of terms in the model associate to the physical properties of buildings, for instance, thermal resistance and heat capacity of building envelope components such as the wall, roof and window. Combining with building dimension and dynamic weather data, monthly energy usage data may be used to estimate the overall heat transfer and solar contribution parameters. A clustering algorithm is applied on all buildings under study to decompose them into groups with similar characteristics. Then a regression or least-square data misfit analysis for each group may separate the overall heat transfer and solar parameters into R-values for building envelope components such as the wall, roof and window. The inversion modeling is used in the present disclosure in one embodiment to estimate underlying physical parameters based on dynamic observable data. A proper model is chosen so that the available data can become usable.

Figure 8:
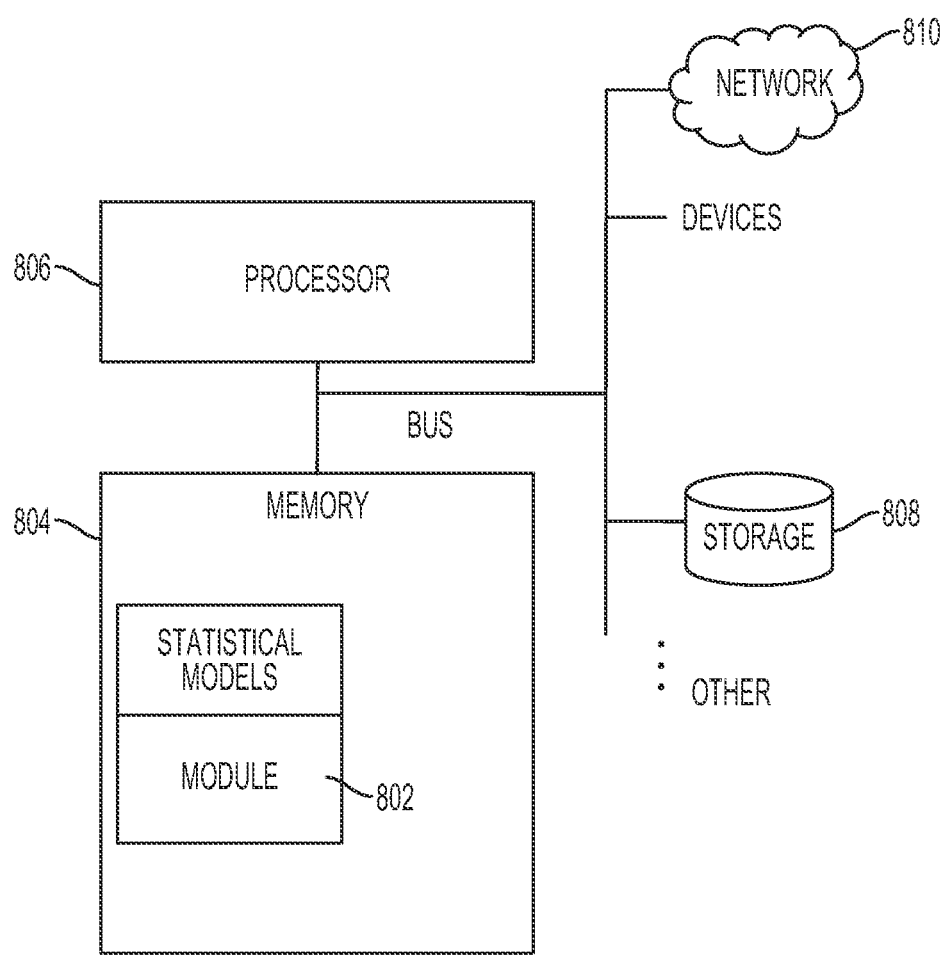
FIG. 8 shows computer system components on which the methodologies of the present disclosure may be carried out in one embodiment.

FIG. 8 shows computer system components on which the methodologies of the present disclosure may be carried out in one embodiment. A processor 806 may be operable to run the methodologies of the present disclosure. In one embodiment, a memory device 804 may store a module 802 and the models of the present disclosure for estimating building thermal properties by combining an integrated heat transfer model with clustering and least-square data misfit techniques for a portfolio of existing buildings as described above. In another embodiment, the methodologies of the present disclosure may be embedded in the circuits of the processor 806. The module 802 and/or computer instructions for carrying out the estimation of building thermal properties, for example, as described herein, may be also stored in a permanent storage device 808 and/or received from a network 810.

Figure 6:
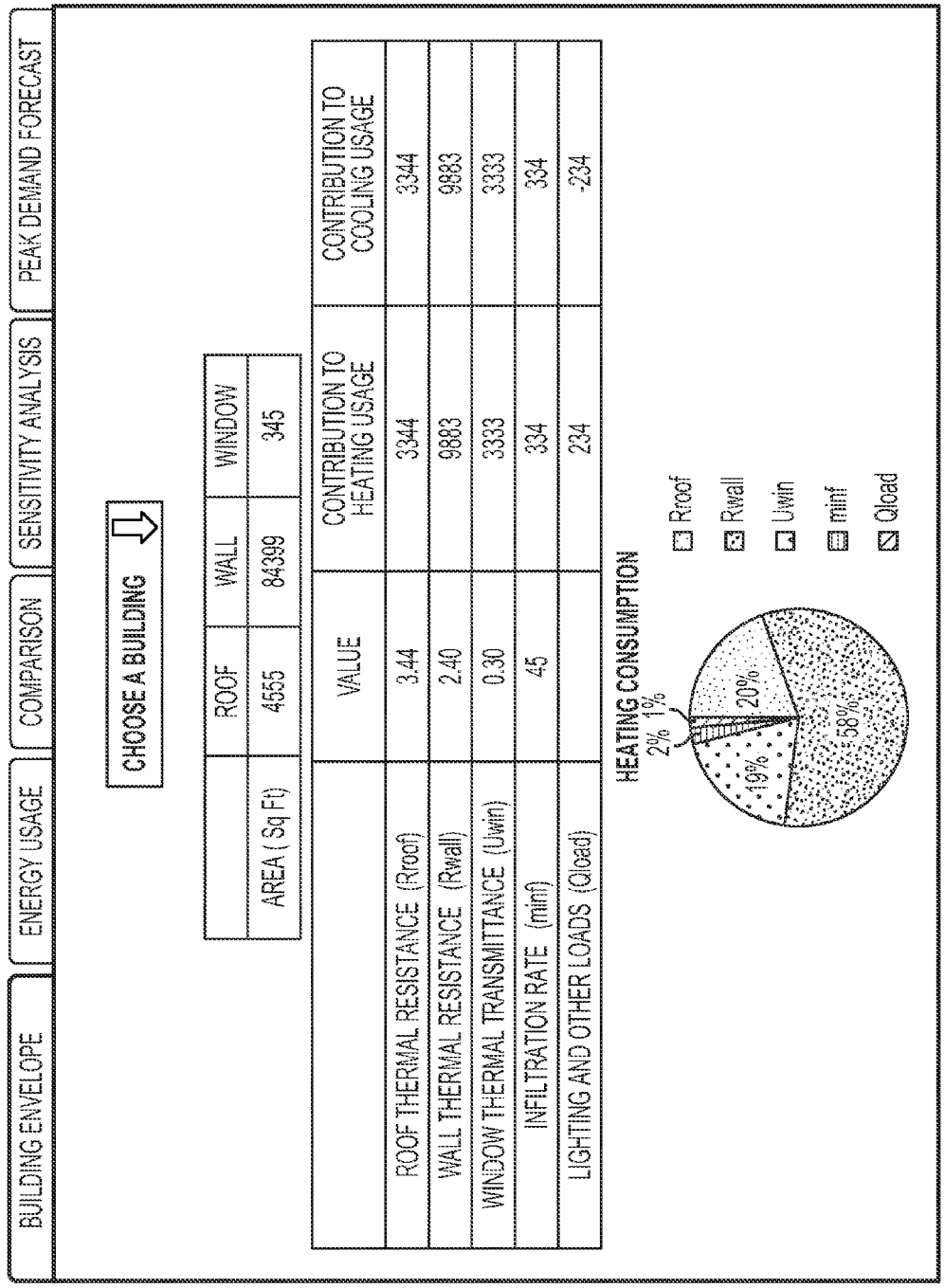
FIG. 6 is an example screen shot of a user interface that presents building envelope parameters determined according to a methodology of the present disclosure in one embodiment.
Figure 7:
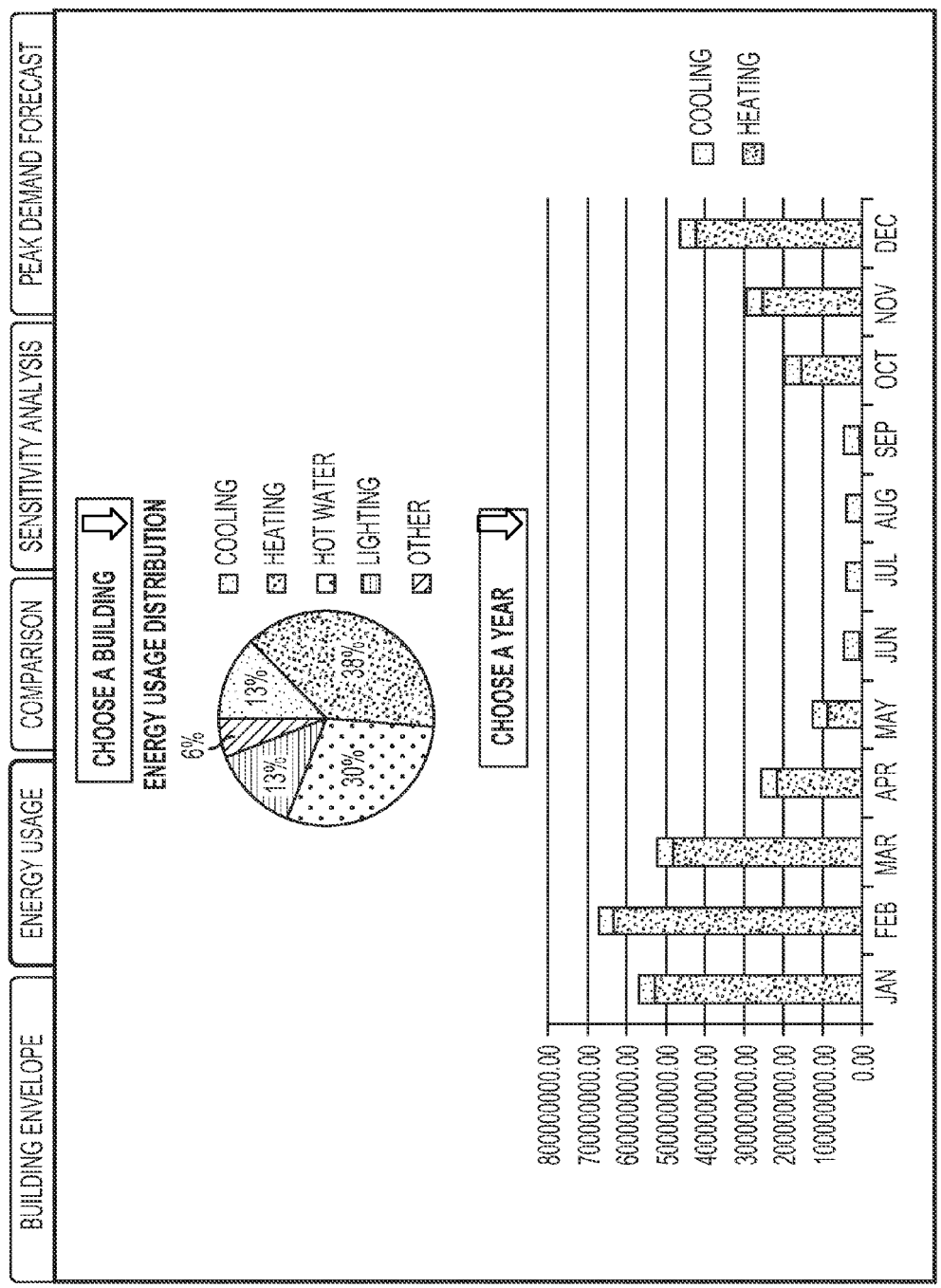
FIG. 7 is an example screen shot of a user interface that presents energy usage information determined according to a methodology of the present disclosure in one embodiment.

The processor 806 may be also operable to execute an interface, for instance, for communicating with the user, receiving data from the user and presenting output to the user. FIG. 6 is an example screen shot of a user interface that presents building envelope parameters determined according to a methodology of the present disclosure in one embodiment. A user may be enabled to select a building, and the user interface presents the resulting estimated parameters. FIG. 7 is an example screen shot of a user interface that presents energy usage information determined according to a methodology of the present disclosure in one embodiment. Via this screen, a user may be able to select a building and view energy usage distribution associated with the building during a selected period of time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of determining heat transfer parameters of a portfolio of existing buildings, comprising:

generating dynamic equations describing heat and moisture transfer through building envelope;

generating a static heat transfer model by transforming the dynamic equations, the static heat transfer model generated by integrating the dynamic equations over a time period covering a season;

quantifying all terms for the generated static heat transfer model based on energy usage data associated with the existing buildings over the time period, dimension information associated with the existing buildings, data associated with one or more characteristics of the existing buildings, temperature information during the time period, and humidity information during the time period;

estimating, by a processor, coefficients of the terms by fitting calculated energy usage with the observed energy usage over multiple time periods, the estimated coefficients representing aggregated quantities of multiple physical properties of the building envelope;

clustering the existing buildings into two or more clusters of buildings based on a physical similarity associated with one or more characteristics of the existing buildings;

developing a regression model for each of the clusters of buildings, the regression model describing how the aggregated quantities mathematically depend on the multiple physical properties of the building envelope; and estimating individual heat transfer parameters associated with individual components of the building envelope based on the regression model and the estimated coefficients representing aggregated quantities of multiple physical properties of the building envelope.

2. The method of claim 1, further including quantifying usage distribution based on the estimated individual heat transfer parameters.

3. The method of claim 1, further including determining sensitivity of energy consumption to change in building insulation infrastructure based on the estimated individual heat transfer parameters.

4. The method of claim 1, wherein the static heat transfer model includes attributes associated with heat conduction, heat convection, solar radiation, latent heat and sensible heat within each zone of the existing buildings.

5. The method of claim 1, wherein the static heat transfer model is generated by integrating the dynamic equations over heating and cooling seasons.

6. The method of claim 5, further including quantifying terms in the static heat transfer model, associating monthly energy usage with heat loss or gain through building envelope, humidity adjustment, offset of sensible load inside and solar impact to the building.

7. The method of claim 1, further including quantifying monthly heat loss and gain through the building envelope with monthly weather data including cooling and heating degree hours, humidifying and dehumidifying hours, solar radiation hours to determine usage distribution and overall thermal parameter of the building.

8. The method of claim 1, wherein the individual heat transfer parameters include heat resistance values associated with a building envelope including a wall, a roof, a window and heat infiltration rate representing volume of air exchange per hour per unit area.

9. The method of claim 1, wherein static heat transfer model includes:

$$\lambda_{env} A_{env} \sum_j (p_c CDH_j + p_h HDH_j) \Delta\tau_j +$$

$$\lambda_{inf} \rho_{air} A_{leak} \sum_j \left( C_{air}(p_c CDH_j + p_h HDH_j) + h_v \frac{p_c CDH_j * DMH_j + p_h * HDH_j * HMH_j}{CDH_j + HDH_j} \right) \Delta\tau_j +$$

$$\lambda_{base} \sum_j \sqrt{GSF \cdot NOP_j} \, \Delta\tau_j + \lambda_{load}$$

$$\sum_j \sqrt{GSF \cdot NOP_j} \, \frac{p_c CDH_j - p_h HDH_j}{CDH_j + HDH_j} \Delta\tau_j +$$

$$\lambda_{sol} A_{env} \sum_j Q_{sol}(j) \frac{p_c CDH_j - p_h HDH_j}{CDH_j + HDH_j} \Delta\tau_j =$$

$$q_{eff} \sum_j Q_{sys}(j) \Delta\tau_j$$

wherein, $p_c$, $p_h$, $q_{eff}$, $A_{env}$, $A_{leak}$, GSF, $\rho_{air}$, $C_{air}$, $h_v$ are a percentage area being air-conditioned, a percentage area being heated, energy usage efficiency, area of the envelope, leak area on the envelope, gross square foot of the building, air density, specific heat of air, specific enthalpy of latent heat respectively; the variables with index j are dynamic observables, NOP, CDH, HDH, DMH, HMH, $Q_{sol}$, $Q_{sys}$ are number of building occupants, cooling degree hours, heat degree hours, dehumidifying hours, humidifying hours, solar radiations, system energy usages respectively, $\Delta\tau$ is length of time period in which observables are available; the variables $\lambda_{env}$, $\lambda_{inf}$, $\lambda_{base}$, $\lambda_{load}$, $\lambda_{sol}$ are to be determined.

10. A system for determining heat transfer parameters of a portfolio of existing buildings, comprising:

a processor;

a dynamic model characterizing heat and moisture transfer through building envelope;

a static heat transfer model transformed from the dynamic equations, the static heat transfer model generated by integrating the dynamic equations over a time period covering a season;

an inverse parameter estimation module operable to execute on the processor and further operable to perform inverse parameter estimation based on at least the static heat transfer model, energy usage data associated with the existing buildings over the time period, dimension information associated with the existing buildings, data associated with one or more characteristics of the existing buildings, temperature information during the time period, and humidity information during the time period, the inverse parameter estimation module operable to determine the heat transfer parameters associated with the overall building envelope based on the inverse parameter estimation;

a clustering module operable to cluster the existing buildings into two or more clusters of buildings based on the dimension information associated with the existing buildings and the data associated with one or more characteristics of the existing buildings;

a regression model associated with each of the clusters of buildings, the regression model describing the heat transfer parameters associated with the overall building envelop in terms of individual components of the building envelop; and a module operable to estimate individual heat transfer parameters associated with the individual components of the building envelope based on the regression model and the heat transfer parameters associated with the overall building envelope.

11. The system of claim 10, wherein the module is further operable to quantify usage distribution based on the estimated individual heat transfer parameters.

12. The system of claim 10, further including determining sensitivity of energy consumption to change in building insulation infrastructure based on the estimated individual heat transfer parameters.

13. The system of claim 10, wherein the static heat transfer model includes parameters associated with heat conduction, heat convection, solar radiation, latent heat and sensible heat within each zone of the existing buildings.

14. The system of claim 10, wherein the static heat transfer model is generated by integrating the dynamic equations over heating and cooling seasons.

15. The system of claim 10, wherein the individual heat transfer parameters include heat resistance values associated with a building envelope including wall, roof, window, and heat infiltration rate representing volume of air exchange per hour per unit area.

16. The system of claim 12, wherein the static heat transfer model includes:

$$\lambda_{env}A_{env}\sum_j (p_c CDH_j + p_h HDH_j)\Delta\tau_j +$$

$$\lambda_{inf}\rho_{air}A_{leak}\sum_j \left(C_{air}(p_c CDH_j + p_h HDH_j) + h_v \frac{p_c CDH_j * DMH_j + p_h * HDH_j * HMH_j}{CDH_j + HDH_j}\right)\Delta\tau_j +$$

$$\lambda_{base}\sum_j \sqrt{GSF \cdot NOP_j}\,\Delta\tau_j + \lambda_{load}$$

$$\sum_j \sqrt{GSF \cdot NOP_j}\,\frac{p_c CDH_j - p_h HDH_j}{CDH_j + HDH_j}\Delta\tau_j +$$

$$\lambda_{sol}A_{env}\sum_j Q_{sol}(j)\frac{p_c CDH_j - p_h HDH_j}{CDH_j + HDH_j}\Delta\tau_j =$$

$$q_{eff}\sum_j Q_{sys}(j)\Delta\tau_j$$

wherein, $p_c$, $p_h$, $q_{eff}$, $A_{env}$, $A_{leak}$, GSF, $\rho_{air}$, $C_{air}$, $h_v$ are a percentage area being air-conditioned, a percentage area being heated, energy usage efficiency, area of the envelope, leak area on the envelope, gross square foot of the building, air density, specific heat of air, specific enthalpy of latent heat respectively; the variables with index j are dynamic observables, NOP, CDH, HDH, DMH, HMH, $Q_{sol}$, $Q_{sys}$ are number of building occupants, cooling degree hours, heat degree hours, dehumidifying hours, humidifying hours, solar radiations, system energy usages respectively, $\Delta\tau$ is length of time period in which observables are available; the variables $\lambda_{env}$, $\lambda_{inf}$, $\lambda_{base}$, $\lambda_{load}$, $\lambda_{sol}$ are to be determined.

17. The system of claim 10, wherein usage distribution and overall thermal parameter of the building are determined based on monthly weather data including cooling and heating degree hours, humidifying and dehumidifying hours, solar radiation hours to determine usage distribution and overall thermal parameter of the building.

18. A computer readable storage medium storing a program of instructions executable by a machine to perform a method of determining heat transfer parameters of a portfolio of existing buildings, comprising:
generating dynamic equations describing heat and moisture transfer through building envelope;
generating a static heat transfer model by transforming the dynamic equations, the static heat transfer model generated by integrating the dynamic equations over a time period covering a season;
quantifying all terms for the generated static heat transfer model based on energy usage data associated with the existing buildings over the time period, dimension information associated with the existing buildings, data associated with one or more characteristics of the existing buildings, temperature information during the time period, and humidity information during the time period;
estimating coefficients of the terms by fitting calculated energy usage with the observed energy usage over multiple time periods, the estimated coefficients representing aggregated quantities of multiple physical properties of the building envelope;
clustering the existing buildings into two or more clusters of buildings based on a physical similarity associated with one or more characteristics of the existing buildings;
developing a regression model for each of the clusters of buildings, the regression model describing how the aggregated quantities mathematically depend on the multiple physical properties of the building envelope; and
estimating individual heat transfer parameters associated with individual components of the building envelope based on the regression model and the estimated coefficients representing aggregated quantities of multiple physical properties of the building envelope.

19. The computer readable storage medium of claim 18, further including quantifying usage distribution based on the estimated individual heat transfer parameters.

20. The computer readable storage medium of claim 18, further including determining sensitivity of energy consumption to change in building insulation infrastructure based on the estimated individual heat transfer parameters.

21. The computer readable storage medium of claim 18, wherein the static heat transfer model includes attributes associated with heat conduction, heat convection, solar radiation, latent heat and sensible heat within each zone of the existing buildings.

22. The computer readable storage medium of claim 18, wherein the static heat transfer model is generated by integrating the dynamic equations over heating and cooling seasons.

23. The computer readable storage medium of claim 18, wherein the individual heat transfer parameters include thermal resistance values associated with a building envelope including a wall, a roof, a window, and heat infiltration rate representing volume of air exchange per hour per unit area.

24. The computer readable storage medium of claim 15, wherein the static heat transfer model includes:

$$\lambda_{env}A_{env}\sum_j (p_c CDH_j + p_h HDH_j)\Delta\tau_j +$$

$$\lambda_{inf}\rho_{air}A_{leak}\sum_j \left(C_{air}(p_c CDH_j + p_h HDH_j) + h_v \frac{p_c CDH_j * DMH_j + p_h * HDH_j * HMH_j}{CDH_j + HDH_j}\right)\Delta\tau_j +$$

$$\lambda_{base}\sum_j \sqrt{GSF \cdot NOP_j}\,\Delta\tau_j + \lambda_{load}$$

$$\sum_j \sqrt{GSF \cdot NOP_j}\,\frac{p_c CDH_j - p_h HDH_j}{CDH_j + HDH_j}\Delta\tau_j +$$

$$\lambda_{sol}A_{env}\sum_j Q_{sol}(j)\frac{p_c CDH_j - p_h HDH_j}{CDH_j + HDH_j}\Delta\tau_j =$$

$$q_{eff}\sum_j Q_{sys}(j)\Delta\tau_j$$

wherein, $p_c$, $p_h$, $q_{eff}$, $A_{env}$, $A_{leak}$, GSF, $\rho_{air}$, $C_{air}$, $h_v$ are a percentage area being air-conditioned, a percentage area being heated, energy usage efficiency, area of the envelope, leak area on the envelope, gross square foot of the building, air density, specific heat of air, specific enthalpy of latent heat respectively; the variables with index j are dynamic observables, NOP, CDH, HDH, DMH, HMH, $Q_{sol}$, $Q_{sys}$ are number of building occupants, cooling degree hours, heat degree hours, dehumidifying hours, humidifying hours, solar radiations, system energy usages respectively, $\Delta\tau$ is length of time period in which observables are available; the variables $\lambda_{env}$, $\lambda_{inf}$, $\lambda_{base}$, $\lambda_{load}$, $\lambda_{sol}$ are to be determined.

* * * * *